Jan. 31, 1967   A. H. STIGLEMAN   3,301,368
CHUTE CONSTRUCTION
Filed May 18, 1965
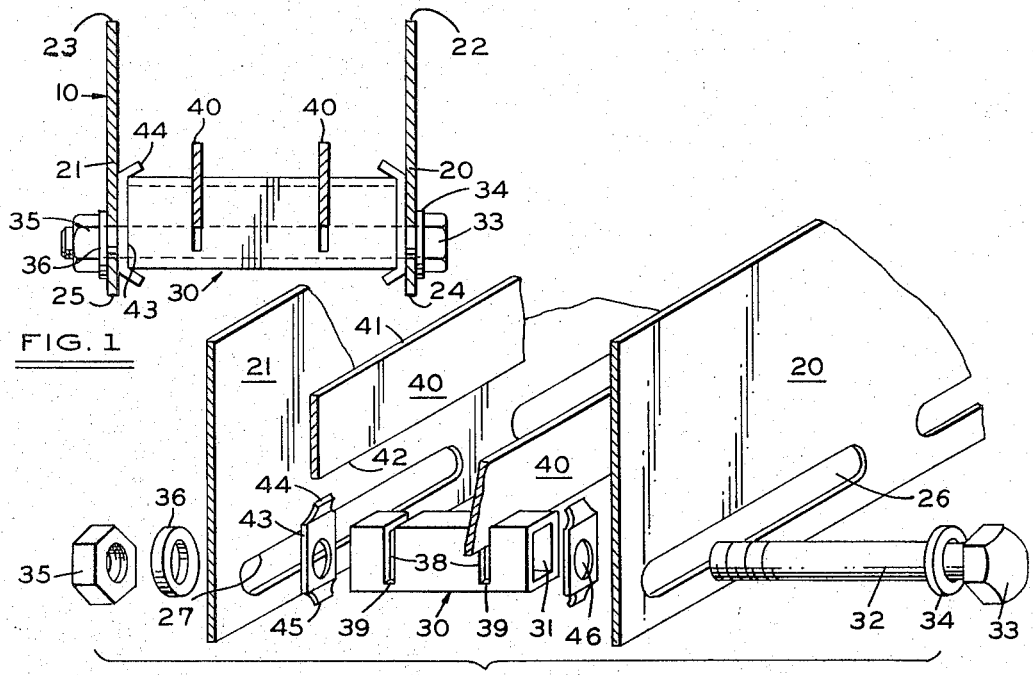
FIG. 1
FIG. 2
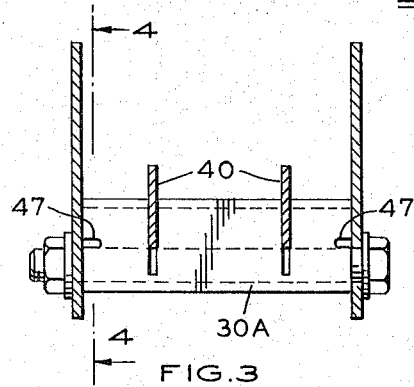
FIG. 3
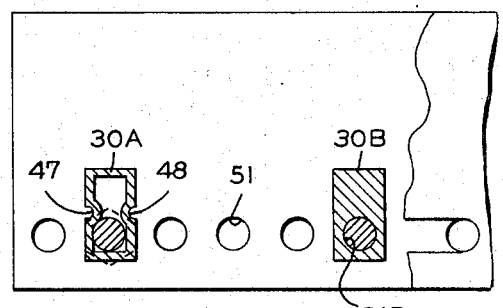
FIG. 4
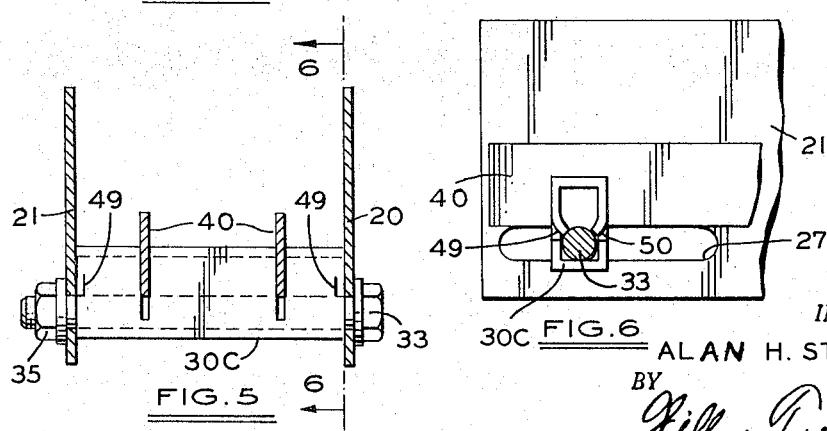
FIG. 5
FIG. 6
INVENTOR.
ALAN H. STIGLEMAN
BY
ATTORNEY

United States Patent Office 3,301,368
Patented Jan. 31, 1967

3,301,368
CHUTE CONSTRUCTION
Alan H. Stigleman, 30656 Woodside Drive,
Franklin Village, Mich. 48025
Filed May 18, 1965, Ser. No. 456,755
1 Claim. (Cl. 193—25)

This invention relates to industrial chutes and in particular to a chute structure having improved assembly, adjustment, and construction features.

Industrial chutes are employed to convey articles between various stations such as machines, treating processes, storage locations, shipping positions, etc. The chutes provide article conveyance and may be used with loaders, unloaders, bins, etc. at various locations. The chutes may be used individually or be part of an automatic material handling system. A factory may have several miles of such chutes.

The chutes are made of long strips of steel lying roughly parallel to one another. The steel is preferably spring steel to provide strength and durability. It is not easy to handle. The strips form guide rails for the sides of the chute and support rails for the center of the chute. The rails lie on edge and are spaced apart. Articles ride on the center support rails in the center and are contained by the guide rails at the sides. The rails are secured together in spaced relationship by spacers and inter-connecting means. As the rails are on edge they are strong and capable of carrying loads over spans between supports. Also as the rails are on edge, they are sidewise flexible. This is an important advantage. It permits the chute to be curved, turned, bent and spiralled to suit the desired path over which the articles are to be conveyed. As mentioned, the path or paths may be quite long. This necessitates assembling the chute on location as they are too long usually to transport when assembled. Consequently the rails are pre-fabricated, the connecting means provided, and the chutes assembled on the job.

However the assembly of a system of chutes using several spring steel rails is no easy job as the rails are shipped coiled and they are un-coiled on the job. They tend to twist and must be prevented from winding up singly and in combination. In the chute assembly the connecting means on the rails and the inter-connecting means between the rails are important as they must aid in holding the rails in the desired path and also provide sidewise flexibility of the chute prior to final tightening.

With the foregoing in view, it is a primary object of the invention to provide connecting means on the rails, novel inter-spacing means for the rails, and novel inter-connecting means for the rails so that the chutes may be progressively assembled in untightened but secured assembled relationship so that they may be flexed sidewise as desired to conform to the desired path of article conveyance.

An object of the invention is to provide a chute having improved assembly, adjustment, and construction features wherein a pair of guide rails may be assembled with spacers, bolts, and nuts and flexed and curved in a desired path as a first assembly stage; the support rails then added as a second assembly stage; and the bolts and nuts then tightened as a third assembly stage enabling an installer to easily and quickly proceed with the assembly and installation by positioning and securing each part sequentially so that his two hands are adequate at any stage of assembly and he is not called upon to position, adjust, and secure a large plurality of parts at any one time.

An object of the invention is to provide lengthwise adjustable connecting means on the side guide rails, such as elongated slots in at least one guide rail so that the inter-connecting means may move lengthwise relative to the guide rails at bends or curves in the chute to compensate for the linear difference in distance between inside and outside guide rails around a bend or curve.

An object of the invention is to provide spacers having a bolt receiving internal bore lying between the guide rails spacing them as desired with bolts lying in the apertures of the guide rails and in each hollow spacer co-operating with a nut so that the guide rails and each spacer, nut, and bolt hold each other and are held themselves relative to one another both in the untightened condition permitting sidewise flexing and in the tightened condition securing the chute against sidewise flexing.

An object of the invention is to provide a slot in the spacer for receiving and positioning each center support rail between the guide rails with the spacer slot slidably holding the support rails in the untightened condition permitting sidewise flexing and fixedly pinch-gripping the center support rails in the tightened condition securing the chute against sidewise flexing.

An object of the invention is to provide support and gripping means for the support rails which eliminate the necessity of forming apertures or other connecting means in the support rails and which eliminates the necessity of aligning the apertures in the support rails relative to the apertures in the guide rails and to the bolts lying between the guide rails.

An object of the invention is to provide means for gripping and holding for the support rails which are capable of receiving, holding, and gripping the center support rails after the gripping means are in assembled self-supporting condition relative to the side guide rails so that the installer may first assemble only the guide rails, bolts, and spacers thus simplifying the assembly operation by allowing the assembly to proceed by progressive stages involving only a few parts at a time rather than necessitating assembling all the parts at one time.

An object of the invention is to provide gripping means for the center support rails which allows the introduction of the center support rails in the assembly as an individual item and which allows the user to turn the support rails over individually when worn to present a new work surface or edge and which allows replacement of the support rails as an individual item without disconnecting the other elements of the chute.

These and other objects of the invention will become apparent by reference to the following description of chute structure embodying the invention taken in connection with the accompanying drawing, in which:

FIG. 1 is a cross-sectional view of a chute embodying the invention.

FIG. 2 is an exploded perspective view of the chute seen in FIG. 1 showing the various parts in detail especially the slotted spacer for securing the support rails and the means for positioning and holding the spacer.

FIG. 3 is a view similar to FIG. 1 showing modified spacer positioning and holding means.

FIG. 4 is a cross-sectional view of FIG. 3 showing round and elongated apertures in the guide rails and the internal structure of modifications of the spacer.

FIG. 5 is a view similar to FIG. 1 showing modified spacer positioning and holding means; and FIG. 6 is a cross-sectional view of FIG. 5 showing the internal construction of the modified spacer and showing the support rail resting on the bolt.

Referring now to the drawing wherein like numerals refer to like and corresponding parts throughout the several views, the chute 10 disclosed therein to illustrate the novel structure and the novel construction of the invention has relatively wide side guide rails 20 and 21. The guide rails 20 and 21 have top edges 22 and 23 and bottom edges 24 and 25 respectively. The guide rails 20, 21 are made of long strips of steel and the steel is preferably spring steel.

Adjacent the bottom edges 24 and 25 elongated apertures 26 and 27 are punched in the guide rails 20 and 21 respectively. A plurality of spacers 30 lie between the guide rails 20 and 21 at spaced positions in the location of the aperatures 26 and 27. Each spacer 30 has a hollow bore 31. A bolt 32 extends through the apertures 26 and 27 of the guide rails and the hollow bore 31 of each spacer 30. The bolt 32 has a head 33 abutting the outside of one guide rail such as the guide rail 20. A lock washer 34 may lie between the head 33 and the rail 20. A nut 35 is threaded on the bolt 32 and abuts the other side rail, such as the side rail 21. A lock washer 36 may lie between the nut 35 and the rail 21.

The spacers 30A and 30B of FIGS. 3 and 4 and the spacer 30C of FIGS. 5 and 6 also have hollow bores for receiving the bolt 32. Each spacer 30 has at least one transverse slot 38. The slots 38 in each spacer 30 leave a reduced cross-sectional portion in each spacer referred to as a web 39. A relatively narrow center support rail 40 lies in the slots 38 of the spacers 30. The support rail 40 is made of a long strip of spring steel and is also difficult to handle. The support rail 40 has a top edge 41 and a bottom edge 42. The bottom edge 42 leads through the slot 38 of the spacer 30 and lies adjacent the bolt 32. The support rail 40 may rest on the bolt 32.

It is desirable to have the spacers 30 positioned and held with their slots 38 extending upwardly above the bolt 32 so that the slots are located properly to receive the support rail 40 in the assembly of the chute. This facilitates positioning the support rail 40 in the slot 38 thus making the assembling of the support rails 40 with the spacers 30 in the chute 10 very easy. Spacer positioning means therefore are provided. These means may be a clip 43 at each end of the spacer 30, FIGS. 1 and 2. The clip 43 has a top tab 44, a bottom tab 45, and an off-center hole 46 adjacent the bottom tab 45. The tabs 44 and 45 engage the spacer 30 and position and hold the clip 43 with its hole 46 adjacent the bottom of the spacer 30. The bolt 32 extends through the hole 46 of the clip 43. The clip 43 thus holds the spacer 30 with the bolt 32 adjacent the bottom of the spacer 30 with the slots 38 extending upwardly above the bolt 32 in position to receive the support rail 40.

In the spacer 30A, 30B, and 30C the positioning and holding means are formed integral. Indentations 47 and 48 at either side of both ends of the spacer 30A contact the bolt 32 and hold the spacer 30A with its slots 38 above the bolt 32, FIGS. 3 and 4. The spacer 30B is solid except for the bore 31B and the slots 38. Thus the bore 31B positions the spacer as desired. Tangs 49 and 50 are lanced out of the spacer 30C at both ends and contact the bolt 32 to properly locate the spacer 30C, FIGS. 5 and 6. While the various modifications of the spacer have been shown as having a rectangular shape in cross-section, it is obvious that the spacer may have any suitable cross-sectional shape such as round, oval, square, hexagonal, etc.

The guide rails 20 and 21, spacer 30, are manufactured in mass. The guide rails 20 and 21 may have elongated apertures 26, 27 or round apertures 51. The long apertures are preferred as they allow for sliding the bolt 32 lengthwise of the guide rails 20, 21 to compensate for linear distance difference between the rails around curves and bends. After fabrication the guide rails 20, 21 are coiled and stored. The fabricated spacers 30, bolts 32, nuts 35, clips 43, and lock washers are stored. The center support rails 40 are bought in the desired width and stored. Thus chutes can be quickly constructed from easily stored pre-fabricated supplies. The pre-fabricated supplies are easily transported to the factory sites for assembly and installation. The various components are easily sequentially assembled on location as hereinafter set forth.

In assembly and installation, the workman first lays out one guide rail 20, 21 in the desired path of conveyance by uncoiling the guide rail along the path. He clamps the ends of the guide rail to prevent twisting and recoiling and he may clamp the guide rail intermediate its ends such as at bends and curves in the path. He then lays out the other guide rail and similarly clamps it in position. He then places a spacer 30 between the rails 20, 21 and inserts a bolt 32 through the apertures 26, 27 and the bore 31 of the spacer 30. He turns the nut 35 on the bolt 32. He may use lock washers 34, 36 if desired. This assembles the side guide rails 20, 21 relative to one another and assembles the spacer 30 relative to the guide rails 20, 21. He tightens the nut 35 only slightly so as not to compress the spacer webs 39 so that the slots 38 are not collapsed but rather left open to receive the support rail 40. He proceeds down the guide rails 20, 21 and similarly bolts the rails 20, 21 and spacers 30 together at spaced intervals.

This partially assembles the chute 10. The chute 10 may now be hung or positioned or the support rails 40 may be assembled and the chute 10 then hung or positioned. The chute is herein described as first being hung or positioned and the center support rails 40 then added.

The partially assembled chute 10 is then hung. The hangers may be stands, building stancheons rafters, braces, drop hangers, machines, bins, etc., adjacent the chute. Due to the untightened condition of the nuts 35 and bolts 32, the chute guide rails 20 and 21 may be flexed sidewise and curves and bends made in the chute to follow the desired path in hanging or positioning the chute. The nuts 35 may be slightly loosened so that the bolts 32 may move endwise in apertures 26 and 27 in the guide rails. This allows the installer to partially construct, adjust, and hang or support the chute with only a minimum number of parts involved; i.e. the side rails, the spacers, and the nuts and bolts. The partial assembly is much easier to control, bend, curve, hang and secure as there is no binding action with the support rails. Relative movement between the two guide rails and the spacers is simple and easy whereas with the addition of the support rails adjustment and relative movement is complex and difficult as the support rails introduce a binding element.

The support rails 40 are then uncoiled and disposed between the guide rails 20, 21 in the slots 38 of the spacers 30. Two such support rails 40 are shown. However there may be only one support rail 40 or there may be several, such as four, seven, or ten. After the support rails 40 are in position in the slots 28 of the spacers 30, the nuts 35 are firmly tightened down on the bolts 32. This compresses the spacers 30 between the guide rails 20, 21 and compresses the webs 39 of the spacers tending to collapse the slots 38. The spacers 30 under compression tend to bend at the webs 39 and this further tends to collapse the slots 39. However the spacer walls defining the slots 39 are initially in close proximity to the support rails 40 so that with only slight collapse of the slots 38 the walls of the spacer defining the slots are urged into forced pinch-gripping relationship relative to the support rails 40. This vice-grips the support rails and holds them firmly in the assembly in inter-supporting relationship binding and securing the chute in its adjusted position. The chute is now ready for use.

In use the articles conveyed ride on the support rails 40 and are contained by the guide rails 20, 21. After continuous heavy use, the top edges 41 of the support rails may become worn. This condition is easily corrected and repaired by loosening the nuts, removing the support rails 40, turning them over, and replacing them with the worn edge 41 down and the new unworn edge 42 up. The nuts and bolts are then tightened and the renovation is complete.

Factory layouts, the location of machines, and material and workpiece flow paths change from time to time. The chute 10 be adjusted easily to conform to these changes by loosening the nuts and bolts and re-aligning the chute.

It is to be particularly noted that the spacer positioning means (such as the clips 43, indentations 47, 48; tangs 49, 50, and solid spacer 31B) hold the spacers relative to the bolts 32 with the slots 38 clear of the bolts ready to receive the support rails. This makes the addition of the support rails easy. It is also to be noted that the spacer positioning means hold the spacers in gripping position relative to the support rails after assembly prior to and after tightening of the nut and bolts. Thus a workman may easily assemble and adjust the chute and realign it and repair it with equal ease and facility as he is not called upon to handle a large plurality of parts with only two hands.

It is also important to note that the support rails need no pre-fabrication. This is a saving. The support rails are reversible. This too is a saving. But even more important is the fact that there are no apertures in the support rails through which bolts must be inserted thus obviating the necessity of aligning the apertures of the guide rails and apertures in the support rails and then holding them all unsecured and adding the spacers, bolts, washers, and nuts. The novel pinch-vise-grip of the spacers holding the support rails in inter-supporting relationship solves the problem and produces the benefits and savings.

The novel chute structure and construction provides an efficient, easily pre-fabricated, stored, transported, assembled, adjusted, repaired, and repositioned chute with a minimum of parts and a maximum of facility.

While only a single embodiment with a few modifications has been shown and described in detail, it is obvious that many changes may be made in the size, shape, detail, and arrangement of the various elements of the invention within the scope of the appended claim.

I claim:

In flexible spring steel chuting having slotted, spaced, parallel side members, bolts spanning said side members lying in said slots, and plain narrow middle members lying parallel between side members on said bolts, the combination of improved spacer-clamping means comprising a slotted tubular spacer lying between said side members receiving said middle members in said slots and internally receiving said bolts,
  said tubular spacer having an axial bore much larger than said bolt, and
  support means on said spacer holding said spacer with said slots upwardly from said bolt so as to engage said middle members especially when the parts are unclamped and loose to hold the parts in assembly and permit flexing of the members to desired shape;
  said spacers being relatively easily compressible so that upon tightening said bolts, said spacers forceably grip said middle members to hold them in assembly.

References Cited by the Examiner

UNITED STATES PATENTS

| | | | |
|---|---|---|---|
| 2,947,401 | 8/1960 | Schuricht et al. | 193—25 |
| 2,948,375 | 8/1960 | Dabich | 193—25 X |
| 3,134,472 | 5/1964 | Schuricht | 193—25 |

ANDRES H. NIELSEN, *Primary Examiner.*

EVON C. BLUNK, *Examiner.*

A. L. LEVINE, *Assistant Examiner.*